United States Patent
Ito et al.

(10) Patent No.: US 8,934,243 B2
(45) Date of Patent: Jan. 13, 2015

(54) ELECTRONIC DEVICE

(75) Inventors: Naoyuki Ito, Osaka (JP); Kazuhiro Shiraga, Osaka (JP); Shinji Goto, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 275 days.

(21) Appl. No.: 13/556,215

(22) Filed: Jul. 24, 2012

(65) Prior Publication Data

US 2013/0027880 A1 Jan. 31, 2013

(30) Foreign Application Priority Data

Jul. 25, 2011 (JP) ................................. 2011-162218
Jul. 20, 2012 (JP) ................................. 2012-161395

(51) Int. Cl.
*H05K 7/20* (2006.01)
*G06F 1/20* (2006.01)

(52) U.S. Cl.
CPC ..................................... *G06F 1/203* (2013.01)
USPC ................... 361/697; 361/679.48; 361/679.5; 361/679.54; 361/692; 361/695; 361/704; 361/709; 415/203

(58) Field of Classification Search
USPC ............... 361/679.47, 679.48, 694–695, 697, 361/703, 704, 709; 415/204, 206, 212, 1, 415/213, 203, 211.1; 165/185
See application file for complete search history.

(56) References Cited

U.S. PATENT DOCUMENTS

| | | | |
|---|---|---|---|
| 6,732,786 B1 * | 5/2004 | Lee | 165/80.3 |
| 6,924,978 B2 * | 8/2005 | DiStefano | 361/688 |
| 7,325,590 B2 * | 2/2008 | Kim et al. | 165/104.33 |
| 7,345,874 B2 * | 3/2008 | Cheng et al. | 361/695 |
| 7,362,568 B2 * | 4/2008 | Huang | 361/679.48 |
| 7,740,054 B2 * | 6/2010 | Yang | 165/104.33 |
| 8,120,910 B2 * | 2/2012 | Hong | 361/695 |
| 8,408,981 B2 * | 4/2013 | Su et al. | 454/358 |
| 8,693,184 B2 * | 4/2014 | Wu et al. | 361/679.47 |
| 2009/0231809 A1 * | 9/2009 | Koide et al. | 361/697 |

(Continued)

FOREIGN PATENT DOCUMENTS

| | | | | |
|---|---|---|---|---|
| JP | 2008-306001 A | | 12/2008 | |
| JP | 2013021121 A | * | 1/2013 | H05K 7/20 |
| TW | 201146155 A | * | 12/2011 | H05K 7/20 |

OTHER PUBLICATIONS

English translation of Wang et al., Taiwan publication TW 201146155 A1, published Dec. 16, 2011, translated in Aug. 2014.*

*Primary Examiner* — Robert J Hoffberg
(74) *Attorney, Agent, or Firm* — James W. Judge

(57) ABSTRACT

A notebook computer 1 is provided with: a casing in which a CPU is accommodated; a heat-dissipating component 37 having a plurality of fins; and a fan 31, and operates such that heat transferred from the CPU to the heat-dissipating component 37 is heat-exchanged with air supplied from the fan 31, and released to the exterior of the casing. The heat-dissipating component 37 is disposed at an air outlet 32b of the fan 31. An opening 35 is formed, between the air outlet 32b and a fan main unit 33, in a fan case 32. First shutter means 39 is provided on a discharge outlet surface of the heat-dissipating component 37. With this structure, increase in cost and weight can be restrained, and dust on the heat-dissipating component can be removed with a simplified structure.

3 Claims, 8 Drawing Sheets

(56) References Cited

U.S. PATENT DOCUMENTS

| | | | |
|---|---|---|---|
| 2009/0321047 A1* | 12/2009 | Chen | 165/80.3 |
| 2010/0048120 A1* | 2/2010 | Chuang et al. | 454/184 |
| 2010/0084123 A1* | 4/2010 | Shishido et al. | 165/200 |
| 2013/0021751 A1* | 1/2013 | Shiraga et al. | 361/697 |
| 2013/0027881 A1* | 1/2013 | Goto et al. | 361/697 |

* cited by examiner (a)

(b)

ELECTRONIC DEVICE

BACKGROUND

1. Field

The present disclosure relates to electronic devices with built-in heat-dissipating units having a heat-dissipating component furnished with a plurality of heat-exchanging fins.

2. Description of the Related Art

In heat-dissipating units of this sort, built into notebook computers and the like, heat from electronic components (heat-emitting components), such as central processing units (CPUs), which emit heat during operation, is transferred through a heat pipe or the like to a heat-dissipating component, heat exchange with air (cooling air) supplied from a fan is made to occur, and the heated air is released to the exterior of the casing of the notebook computer or the like, thereby effectively cooling the heat-emitting components.

In a conventional heat-dissipating unit of this sort, it is effective to increase the surface area of the fins in order to enhance the heat-dissipating effect, and a plurality of fins are arrayed in a narrow, limited space at a narrow spacing. However, when the spacing at which the plurality of fins are arrayed is narrow, fine dust contained in the air (cooling air) supplied from the fan is likely to adhere to, particularly, the surface of the heat-dissipating component (that is, the inflow surface) on the side that opposes the fan (hereinafter, referred to as the inflow side since it is where air (cooling air) flows in). Once dust adheres to the heat-dissipating component, the dust is likely to accumulate rapidly, and the accumulated dust covers the entire surface of the heat-dissipating component on the inflow side. As a result, it is difficult to supply cooling air from the fan into the gaps between adjacent fins, and consequently there is significant deterioration in the heat-dissipating effect of the heat-dissipating unit.

To address this issue, as described below, a heat-dissipating unit having a mechanism for removing dust clinging to the heat-dissipating component has been suggested to date, in Japanese Laid-Open Patent Publication No. 2008-306001.

Referring to FIG. 8, a heat-dissipating unit suggested in the aforementioned Japanese Laid-Open Patent Publication No. 2008-306001 includes: a heat-dissipating component 50 having a plurality of flow paths 51 formed therein, and having a plurality of heat-exchanging fins 52; a brush 53, disposed on the inflow side of the heat-dissipating component 50, which acts as a cleaning component for removing dust on the heat-dissipating component 50 by being inserted into the flow paths 51; a brush rotation pivot 55 and a brush driving pivot 56 for supporting the brush 53 such that the brush 53 is rotatably mounted in an exterior case 54; and a brush driving section 57, such as, for example, a motor, capable of driving the brush 53.

SUMMARY

However, in an electronic device in which the heat-dissipating unit suggested in Japanese Laid-Open Patent Publication No. 2008-306001 is installed, the brush and the brush driving section such as a motor need to be additionally incorporated. Therefore, the number of components and the number of assembly process steps are increased, and, further, space for housing these components has to be set aside. The consequent problem that arises is that the cost increases. A further problem that arises with an electronic device in which the heat-dissipating unit suggested in Japanese Laid-Open Patent Publication No. 2008-306001 is installed is that the increase in the number of components leads to an increase in the device weight.

An object of the present disclosure is to make available an electronic device with a built-in heat-dissipating unit that enables increase in cost and increase in weight to be restrained, and enables dust on the heat-dissipating component to be removed with a simplified structure.

An electronic device according to the present disclosure is an electronic device that is furnished with: a casing in which electronic components including a heat-emitting component that emits heat during operation are accommodated; and a heat-dissipating unit including a heat-dissipating component having a plurality of fins to which heat is transferred from the heat-emitting component, and a fan for supplying air to the heat-dissipating component, whereby heat transferred from the heat-emitting component to the heat-dissipating component is heat-exchanged with air from the fan, releasing the heated air to the exterior of the casing. The heat-dissipating component is disposed in close contact with an air outlet of the fan. The electronic device is furnished with first shutter means, provided on a surface of the heat-dissipating component on a side thereof that is reverse from a side thereof that opposes the fan, for opening and closing that surface, and with an opening formed in a fan case of the fan and positioned between the air outlet and a fan main unit.

According to the present disclosure, made available is an electronic device with a built-in heat-dissipating unit that enables increase in the cost and increase in the weight to be restrained, and enables dust on the heat-dissipating component to be removed with a simplified structure.

DETAILED DESCRIPTION

Hereinafter, an embodiment will be described in detail with reference to the drawings as necessary. However, unnecessarily detailed description may not be given. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Hereinafter, an exemplary case in which an electronic device is a notebook computer will be described in more detail according to an embodiment.

[Structure of Electronic Device]

Figure 1:
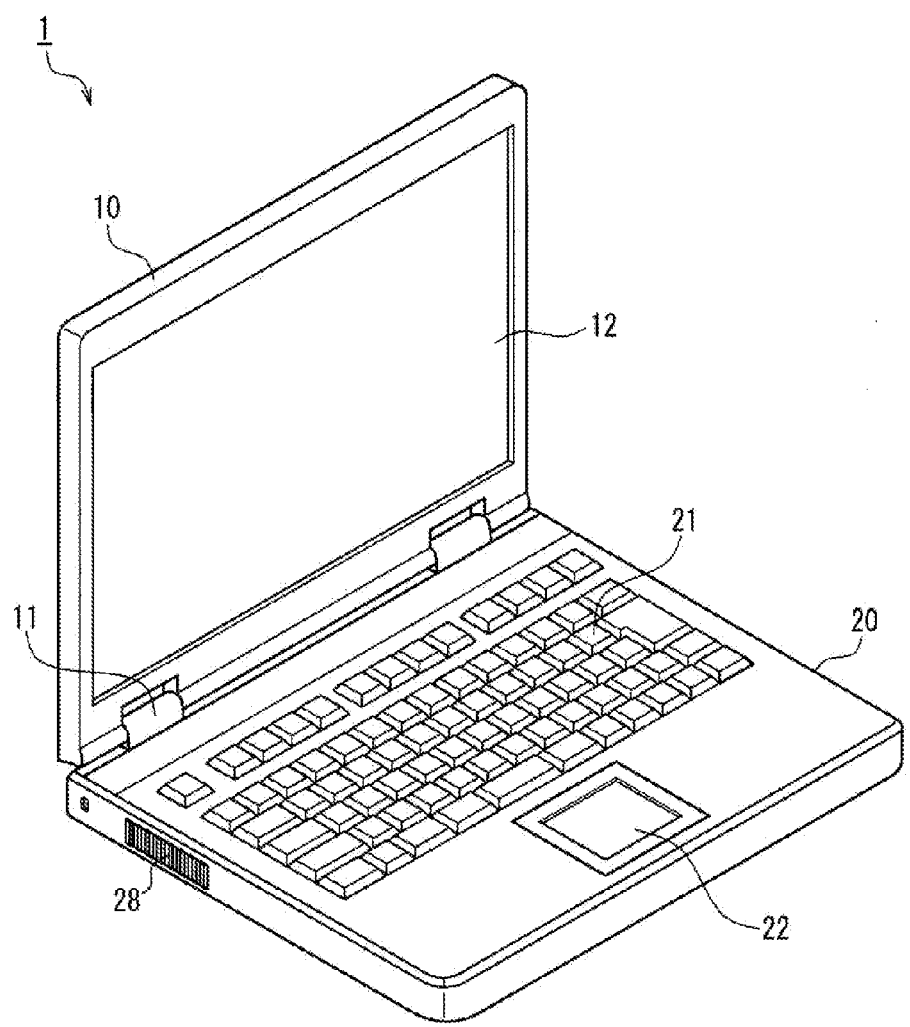
FIG. 1 is a schematic perspective view of an external structure of a notebook computer.

FIG. 1 is a schematic perspective view of an external structure of a notebook computer 1 according to the present embodiment.

As shown in FIG. 1, in the notebook computer 1, a cover component 10 having a display device 12, such as a liquid crystal panel, disposed on an inner side surface thereof is mounted so as to be pivotable, by means of a hinge mechanism 11, relative to a main unit 20 having input devices, such as a keyboard 21 and a pointing device 22, disposed on the surface thereof. In the following description, "upper" represents a direction in which the main unit 20 is opposed to the display device 12 when the cover component 10 having the display device 12 covers the main unit 20 by rotating about the pivot of the hinge mechanism 11, and represents a direction from the main unit 20 toward the display device 12 when the cover component 10 covers the main unit 20. "Lower" represents a direction opposite thereto.

Inside the main unit 20, a not-illustrated secondary battery acting as a power supply for operating the notebook computer 1, a not-illustrated hard disk drive (HDD) acting as a main storage device, and other electric components are disposed. The notebook computer 1 can include, for example, an antenna module for wireless LAN communications, a disk drive for Blu-ray Discs™ and DVD discs, a web camera device, an audio microphone and loudspeaker, and various other input/output terminals. The function and form thereof are the same as those of conventionally well-known notebook computers, and illustration and detailed description thereof are not given.

[Structure of Heat-Dissipating Unit]

Figure 2:
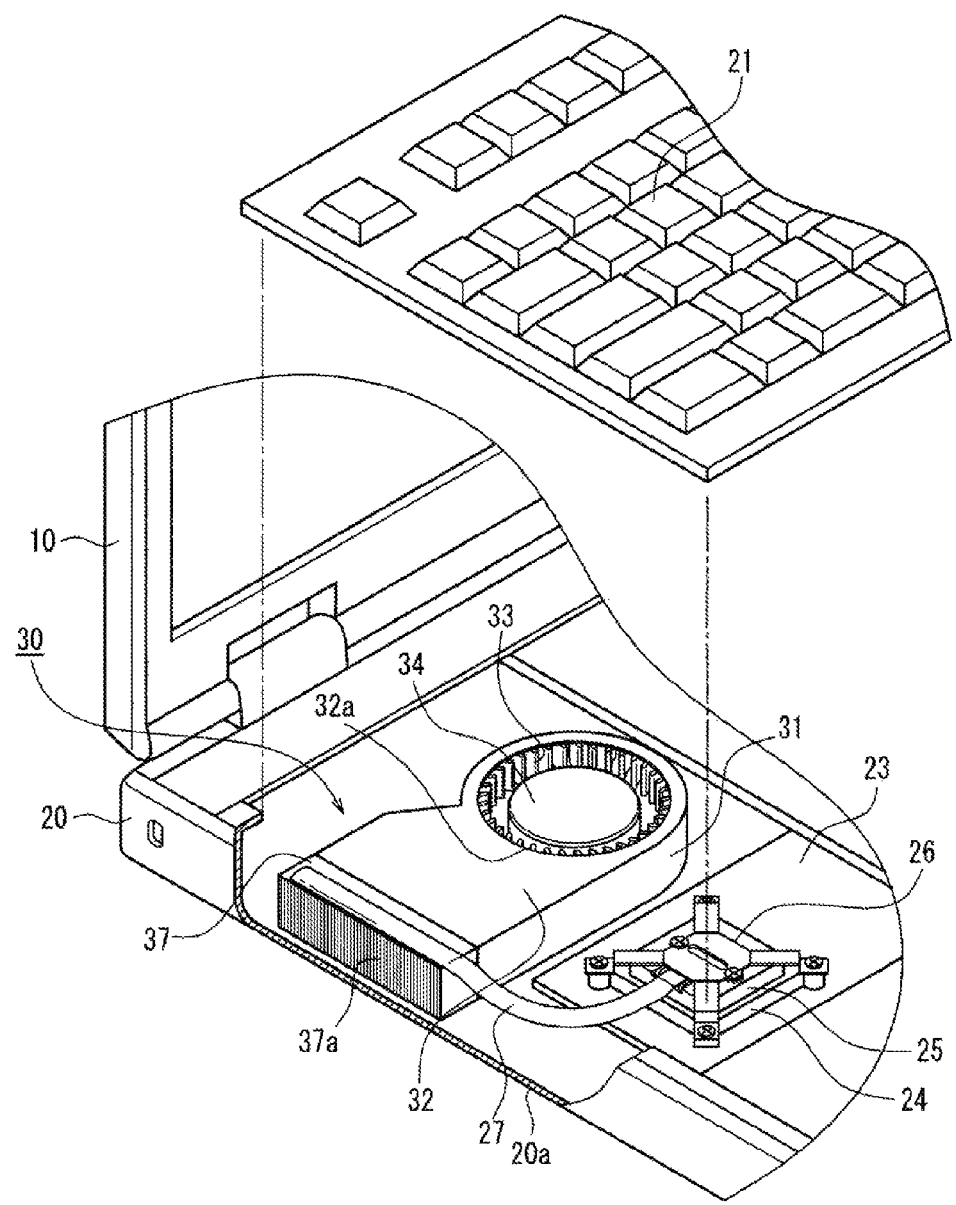
FIG. 2 is a schematic exploded perspective view illustrating main components of a heat-dissipating unit built into the notebook computer.
Figure 3:
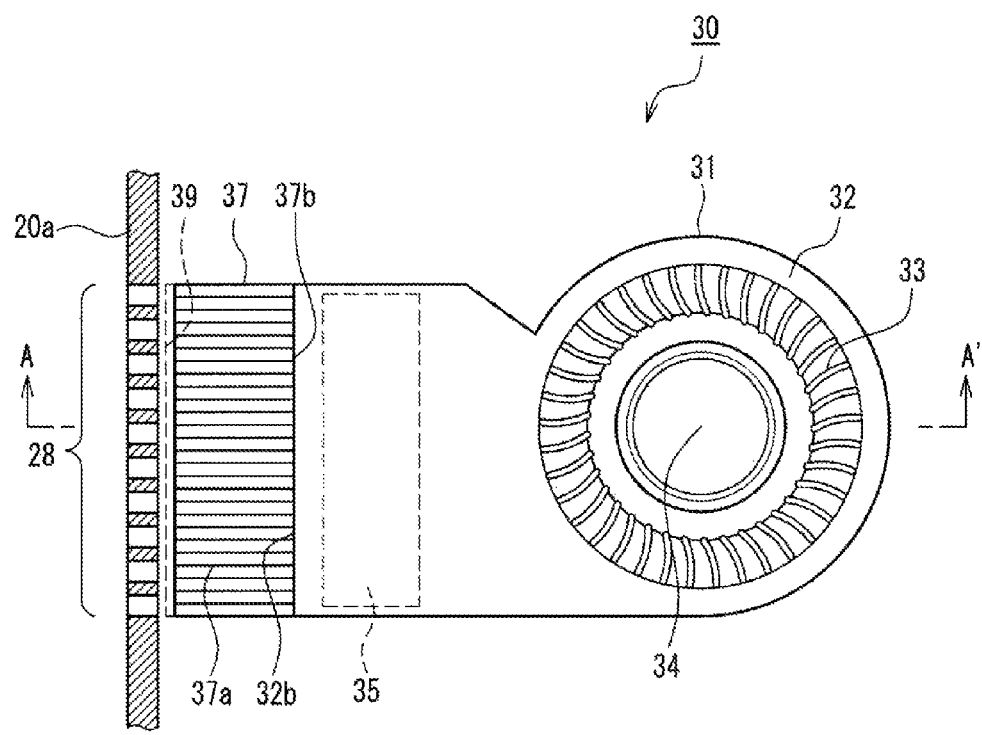
FIG. 3 is a schematic horizontal cross-sectional view of the structure of the heat-dissipating unit.
Figure 4:
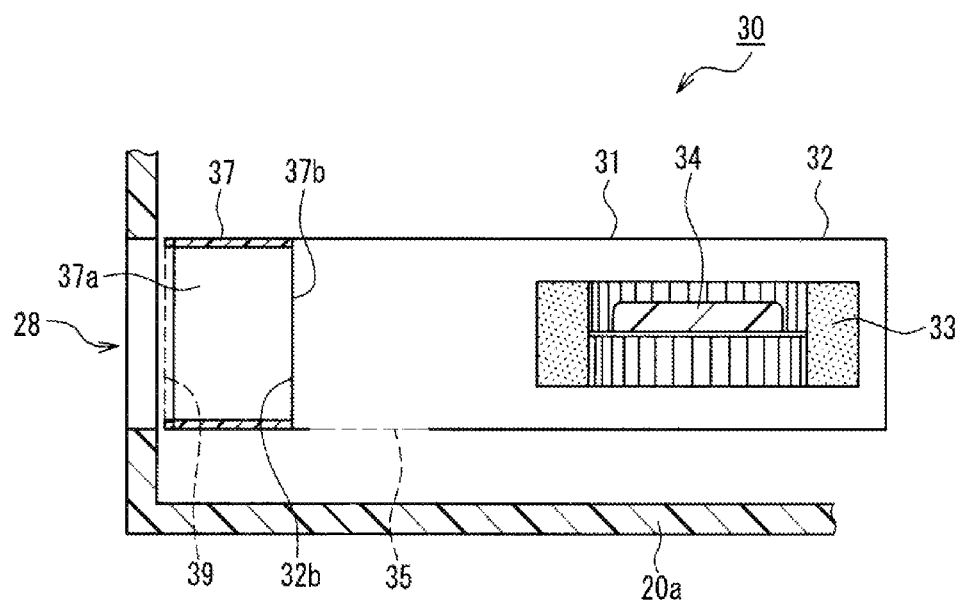
FIG. 4 is a schematic cross-sectional view (schematic vertical cross-sectional view) taken along the line A-A shown in FIG. 3.

Next, a structure of a heat-dissipating unit 30 built into the notebook computer 1 will be described with reference to FIG. 2 to FIG. 4. FIG. 2 is a schematic exploded perspective view illustrating main components of the heat-dissipating unit 30. FIG. 3 is a schematic horizontal cross-sectional view of the structure of the heat-dissipating unit 30. FIG. 4 is a schematic cross-sectional view (schematic vertical cross-sectional view) taken along the line A-A' shown in FIG. 3. FIG. 2 illustrates, in an enlarged manner, only a central processing unit (CPU) 24 and its environs, the CPU 24 being representative of a heat-emitting component whose temperature during operation goes highest among the various electronic components disposed in the main unit 20, and the heat-dissipating unit 30, for releasing heat emitted from the CPU 24 to the exterior of a casing 20a forming an exterior case of the main unit 20, and the unit 30 environs.

As shown in FIG. 2, the CPU 24 is mounted and disposed on a circuit substrate 23, below the keyboard 21 disposed on the surface, inside the main unit 20 of the notebook computer 1. On the top surface of the CPU 24, a heat receiving section 25 is disposed for receiving heat generated while the CPU 24 is operating. The heat receiving section 25 is mechanically and thermally fixed to the CPU 24, which is a heat source, so as to be pressed against the CPU 24, by means of a fixing component 26 having spring-like legs.

To the heat receiving section 25, one end of a heat pipe 27 made of, for example, copper is connected for transferring the received heat to the heat-dissipating unit 30, and the other end of the heat pipe 27 is mechanically and thermally connected to the top surface of a heat-dissipating component 37, described below. The heat pipe 27 is formed of, for example, copper in a tubular shape, and has sealed therein a heat conductive medium, such as an alternative for chlorofluorocarbon, having a high heat conductivity, thereby efficiently transferring, to the heat-dissipating component 37, heat received from the CPU 24 by the heat receiving section 25.

The heat-dissipating unit 30 includes: the heat-dissipating component 37 having a plurality of fins 37a to which heat is transferred from the CPU 24; and a fan 31 for supplying air (cooling air) to the heat-dissipating component 37. As described above, the other end of the heat pipe 27 is mechanically and thermally connected to the top surface of the heat-dissipating component 37. Heat exchange between air (cooling air) supplied from the fan 31, and heat transferred from the CPU 24 to the heat-dissipating component 37 is made to occur, and the heated air is released to the exterior of the casing 20a. The heated air is released to the exterior of the casing 20a through a discharge outlet 28 (see FIG. 1, and FIG. 3 and FIG. 4 referred to below) that is formed as slits in the casing 20a so as to correspond to the shape of the heat-dissipating component 37. Further, air (cooling air) to be supplied from the fan 31 to the heat-dissipating component 37 is drawn in through an air inlet 32a formed in the top surface of a fan case 32.

As shown in FIG. 2 to FIG. 4, in the fan 31, a fan main unit 33 accommodated in the fan case 32 spins with a rotation shaft 34 as its axial center, to draw in ambient air through the air inlet 32a, which is formed in the top surface of the fan case 32. Air having been drawn in through the air inlet 32a is introduced into the air-dissipating component 37 through an inflow surface 37b of the air-dissipating component 37, which is opposed to and in close contact with an air outlet 32b. Air having been introduced into the heat-dissipating component 37 passes, as cooling air, through gaps where the plurality of fins 37a oppose each other, and is discharged through a discharge outlet surface of the heat-dissipating component 37. The shape of the entirety of the fan 31, the shape of the air inlet 32a, the shape of the fan main unit 33 that rotates about the rotation shaft 34, and the like as shown in FIG. 2 to FIG. 4 are exemplary. The fan 31 may be any of various types of cooling fans which can draw in ambient air through an air inlet, and discharge air through an air outlet, as conventionally used.

The heat-dissipating component 37 is made of a metal such as, for example, copper having a high heat conductivity, and has the plurality of fins 37a that are formed as a plurality of thin-plate-like components so as to extend parallel to a direction in which cooling air discharged from the fan 31 flows toward the exterior of the casing 20a. The cooling air having passed through the gaps among the fins 37a of the heat-dissipating component 37 is discharged outside the casing 20a through the discharge outlet 28 which is formed as slits in the casing 20a so as to correspond to the shape of the heat-dissipating component 37. The bottom surface of the heat-dissipating component 37 is flush with the bottom surface of the air outlet 32b of the fan 31, and the size of the heat-dissipating component 37 is such that, particularly, the width and the height of the heat-dissipating component 37 as viewed from the fan 31 side are equal to the width and the height of the air outlet 32b of the fan 31. The heat-dissipating component 37 is disposed in close contact with the air outlet 32b provided in the fan case 32 of the fan 31.

[1-1. Dust Removal Mechanism]

Next, a dust removal mechanism of the heat-dissipating unit will be described with reference to FIG. 2 to FIG. 4.

As shown in FIG. 2 to FIG. 4, the heat-dissipating unit 30 of the present embodiment has a structure in which the heat-dissipating component 37 is disposed in close contact with the air outlet 32b provided in the fan case 32 of the fan 31. Therefore, air (cooling air) supplied from the fan main unit 33 of the fan 31 is discharged to the exterior of the casing 20a through the discharge outlet surface of the heat-dissipating component 37 without leaking from between the air outlet 32b of the fan 31 and the heat-dissipating component 37.

First shutter means 39 is provided on the discharge outlet surface of the heat-dissipating component 37 for opening and closing the discharge outlet surface. The first shutter means 39 is structured so as to be in close contact with at least the fins 37a forming the outer portion of the heat-dissipating component 37. In a state where the first shutter means 39 is closed, air (cooling air) supplied from the fan 31 is sealed in.

An opening 35 is formed, between the air outlet 32b and the fan main unit 33, in the bottom surface of the fan case 32 of the fan 31.

The first shutter means 39 may be of any of various opening-and-closing types, such as a sliding-door opening/shutting type, a window-shade opening/closing type, a hinge-door opening/shutting type, a venetian-blind opening/shutting type, or the like. Further, the first shutter means 39 can be operated by, for example, an opening-and-closing switch being operated.

As described above, the dust removal mechanism is structured such that the heat-dissipating component 37 is disposed in close contact with the air outlet 32b of the fan 31, and the dust removal mechanism includes: the first shutter means 39 provided on the discharge outlet surface of the heat-dissipating component 37 for opening and closing the discharge outlet surface; and the opening 35 formed, between the air outlet 32b and the fan main unit 33, in the bottom surface of the fan case 32 of the fan 31.

In a case where the dust removal mechanism has such a structure, when the first shutter means 39 for opening and closing the discharge outlet surface of the heat-dissipating component 37 is caused to be in the closed state in a state where the fan 31 is operating, a direction in which air flows from the fan main unit 33 of the fan 31 can be changed from a direction from the fan main unit 33 toward the heat-dissipating component 37 to a direction along the inflow surface 37b of the heat-dissipating component 37 toward the opening 35. Thus, air (cooling air) supplied from the fan main unit 33 strikes against dust on the inflow surface 37b of the heat-dissipating component 37 and flows toward the opening 35. Therefore, dust on the inflow surface 37b, which is the end surface of the plurality of fins 37a of the heat-dissipating component 37 on the side thereof on which cooling air flows into the heat dissipating component 37, can be removed and discharged outside the fan case 32 through the opening 35. As a result, the notebook computer 1 can be provided which has built thereinto the heat-dissipating unit 30 that enables increase in cost and increase in the weight to be restrained, and enables dust on the heat-dissipating component 37 to be removed with a simplified structure.

[1-2. Dust Removal Method]

Figure 5:
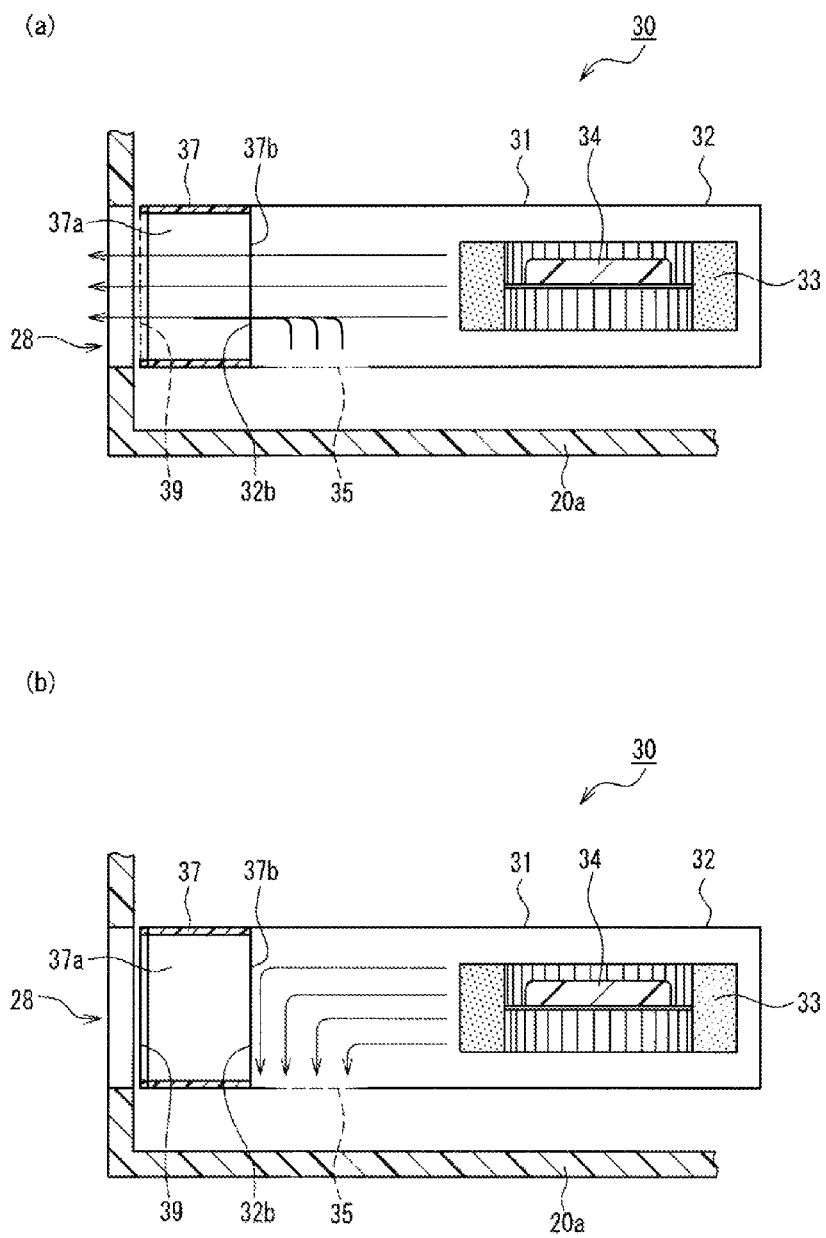
FIG. 5 is a schematic vertical cross-sectional view illustrating a method for removing dust on a heat-dissipating component of the heat-dissipating unit.

Next, a method for removing dust on the heat-dissipating component 37 of the heat-dissipating unit 30 built into the notebook computer 1 will be described with reference to the schematic vertical cross-sectional view of FIG. 5.

When the fan 31 is operating in order to release, from the heat-dissipating component 37, heat which is generated when heat-emitting components such as the CPU 24 operate, the first shutter means 39 for opening and closing the discharge outlet surface of the heat-dissipating component 37 is in the opened state as shown in FIG. 5(a) (the first shutter means 39 in the opened state is represented by a dashed line). Further, when air (cooling air) supplied from the fan 31 flows toward the heat-dissipating component 37, as long as adhesion of dust on the inflow surface 37b of the heat-dissipating component 37 has not become advanced, air (cooling air) is drawn in through the opening 35 by flow of air (cooling air) supplied from the fan 31 to the heat-dissipating component 37, and flows in, as represented by dashed lines. The inflow of air (cooling air) through the opening 35 is when dust accumulation on the heat-dissipating component 37 as described above is slight. When the amount of accumulation grows large, the air (cooling air) is discharged through the opening 35. Therefore, flow of air through the opening 37 may be detected, to switch the first shutter means 39 between in the opened state and in the closed state.

Therefore, air (cooling air) flowing from the fan main unit 33 of the fan 31 and air flowing in through the opening 35 directly pass through the heat-dissipating component 37, and is discharged outside the casing 20a through the discharge outlet 28 together with heat which is generated when the heat-emitting components such as the CPU 24 operate.

In a case where dust on the inflow surface 37b of the heat-dissipating component 37 is removed, the first shutter means 39 for opening and closing the discharge outlet surface of the heat-dissipating component 37 is caused to be in the closed state in a state where the fan 31 is operating, as shown in FIG. 5(b) (the first shutter means 39 in the closed state is represented by a solid line).

Thus, a direction in which air flows from the fan main unit 33 of the fan 31 can be changed from a direction from the fan main unit 33 toward the heat-dissipating component 37 to a direction along the inflow surface 37b of the heat-dissipating component 37 toward the opening 35. As a result, air (cooling air) supplied from the fan main unit 33 strikes against dust on the inflow surface 37b of the heat-dissipating component 37 and flows toward the opening 35. Therefore, dust on the inflow surface 37b, which is the end surface of the plurality of fins 37a of the heat-dissipating component 37 on the side thereof on which cooling air flows into the heat dissipating component 37, is removed. The dust removed from the heat-dissipating component 37 is directly discharged outside the fan case 32 through the opening 35, together with air (cooling air) flowing toward the opening 35.

For the present embodiment, an exemplary case is described in which the opening 35 is formed in the bottom surface of the fan case 32 of the fan 31. However, the structure of the present disclosure is not limited to such a structure. The opening 35 may be formed in the top surface or the side surface of the fan case 32 between the air outlet 32b and the fan main unit 33. When the first shutter means 39 for opening and closing the heat-dissipating component 37 on the discharge outlet side is in the closed state on whatever surface the opening 35 is formed, a direction in which air flows from the fan main unit 33 of the fan 31 can be changed from a direction from the fan main unit 33 toward the heat-dissipating component 37 to a direction toward the opening 35 along the inflow surface 37b of the heat-dissipating component 37 on the side on which cooling air flows in. Thus, air (cooling air) supplied from the fan main unit 33 strikes against dust on the inflow surface 37b of the heat-dissipating component 37 and flows toward the opening 35. Therefore, dust on the inflow surface 37b of the heat-dissipating component 37 can be removed and discharged outside the fan case 32 through the opening 35. However, in a case where the opening 35 is formed in the bottom surface of the fan case 32, the weight of the dust itself facilitates its discharge through the opening 35. For that reason the opening 35 may be formed in the bottom surface of the fan case 32.

[2-1. Dust Removal Mechanism]

Next, another structure of the dust removal mechanism of the heat-dissipating unit will be described with reference to FIG. 2, FIG. 3, and FIG. 6.

Figure 6:
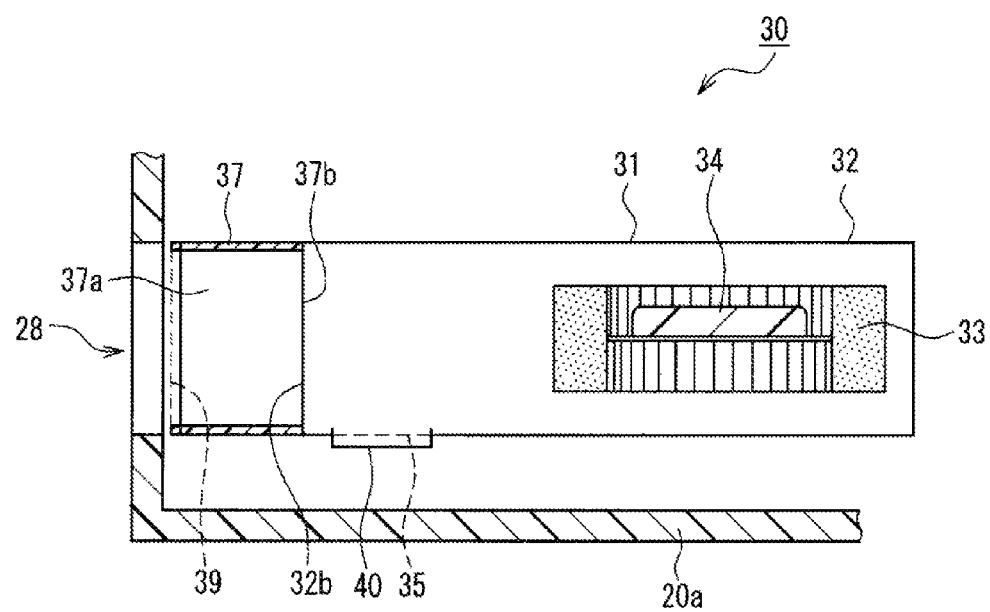
FIG. 6 is a schematic cross-sectional view (schematic vertical cross-sectional view) of another heat-dissipating unit taken along the line A-A' shown in FIG. 3.

As shown in FIG. 2, FIG. 3, and FIG. 6, the heat-dissipating unit 30 has a structure in which the heat-dissipating component 37 is disposed in close contact with the air outlet 32b provided in the fan case 32 of the fan 31. Therefore, air (cooling air) supplied from the fan main unit 33 of the fan 31 is discharged outside the casing 20a through the discharge outlet surface of the heat-dissipating component 37 without leaking from between the air outlet 32b of the fan 31 and the heat-dissipating component 37.

The first shutter means 39 is provided on the discharge outlet surface of the heat-dissipating component 37 for opening and closing the discharge outlet surface. The first shutter means 39 is structured so as to be in close contact with at least the fins 37a forming the outer portion of the heat-dissipating component 37. In a state where the first shutter means 39 is closed, air (cooling air) supplied from the fan 31 is sealed in.

The opening 35 is formed, between the air outlet 32b and the fan main unit 33, in the bottom surface of the fan case 32 of the fan 31. Further, at the opening 35, second shutter means 40 is provided for opening and closing the opening 35. The outer sides of the second shutter means 40 are structured so as to be in close contact with the opening 35. In a state where the second shutter means 40 is closed, air (cooling air) supplied from the fan 31 is sealed in.

The first shutter means 39 and the second shutter means 40 may be of any of various opening-and-closing types, such as a sliding-door opening/shutting type, a window-shade opening/closing type, a hinge-door opening/shutting type, a venetian-blind opening/shutting type, or the like. Further, the first shutter means 39 and the second shutter means 40 can be operated by, for example, an opening and closing switch being operated.

As described above, the dust removal mechanism is structured such that the heat-dissipating component 37 is disposed in close contact with the air outlet 32b of the fan 31, and the dust removal mechanism includes: the first shutter means 39 provided on the discharge outlet surface of the heat-dissipating component 37 for opening and closing the discharge outlet surface; the opening 35 formed, between the air outlet 32b and the fan main unit 33, in the bottom surface of the fan case 32 of the fan 31; and the second shutter means 40 provided at the opening 35 for opening and closing the opening 35.

In a case where the dust removal mechanism has such a structure, in a state where the fan 31 is operating, the first shutter means 39 for opening and closing the discharge outlet surface of the heat-dissipating component 37 is caused to be in the closed state, and the second shutter means 40 for opening and closing the opening 35 formed in the bottom surface of the fan case 32 is caused to be in the opened state. In this case, a direction in which air flows from the fan main unit 33 of the fan 31 can be changed from a direction from the fan main unit 33 toward the heat-dissipating component 37 to a direction along the inflow surface 37b of the heat-dissipating component 37 toward the opening 35. Thus, air (cooling air) supplied from the fan main unit 33 strikes against dust on the inflow surface 37b of the heat-dissipating component 37 and flows toward the opening 35. Therefore, dust on the inflow surface 37b, which is the end surface of the plurality of fins 37a of the heat-dissipating component 37 on the side thereof on which cooling air flows into the heat dissipating component 37, can be removed, and discharged outside the fan case 32 through the opening 35. As a result, the notebook computer 1 can be provided which has built thereinto the heat-dissipating unit 30 that enables increase in cost and increase in the weight to be restrained, and enables dust on the heat-dissipating component 37 to be removed with a simplified structure.

[2-2. Dust Removal Method]

Figure 7:
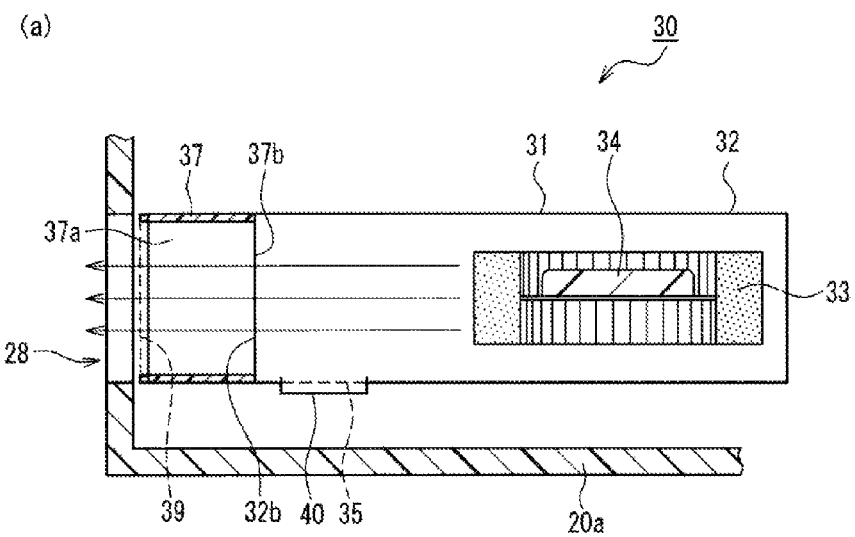
FIG. 7 is a schematic vertical cross-sectional view illustrating a method for removing dust on a heat-dissipating component of the other heat-dissipating unit.
Figure 7:
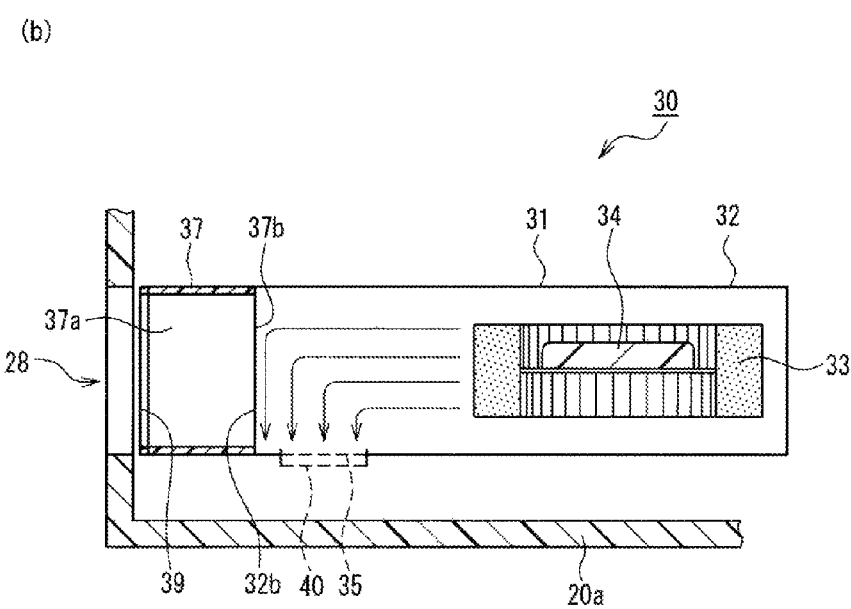
Figure 8:
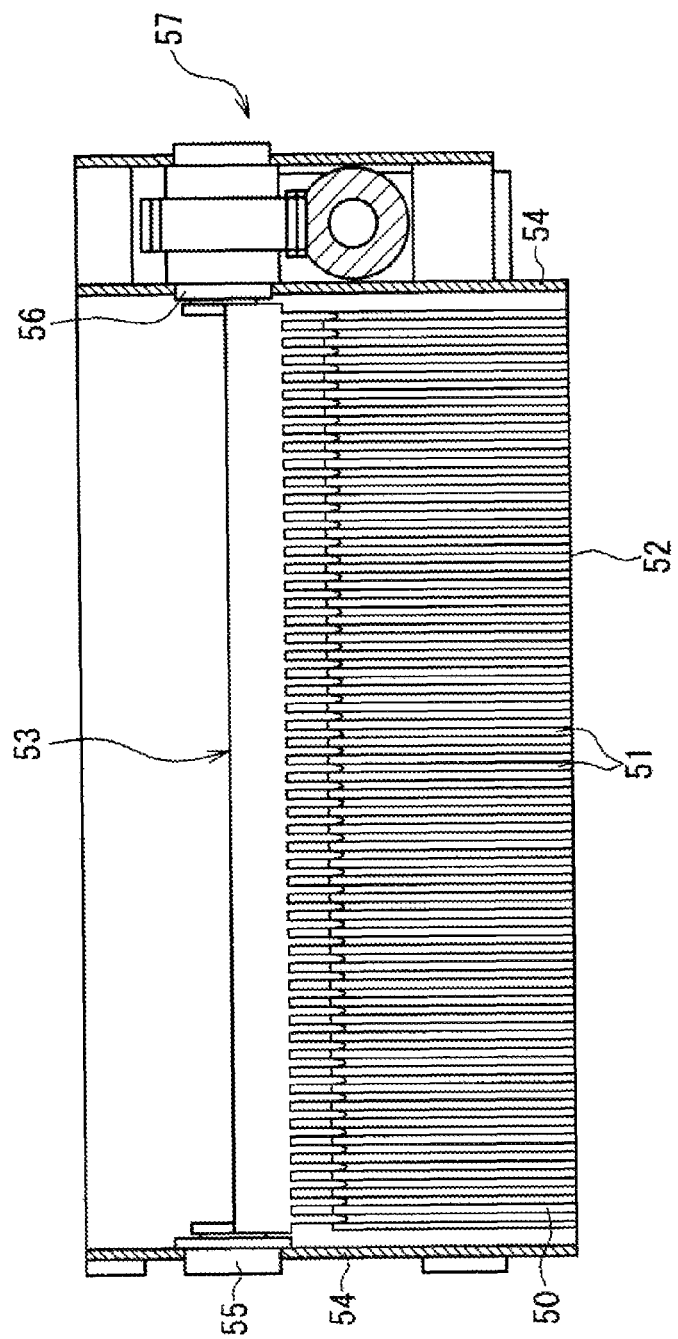
FIG. 8 is a schematic horizontal cross-sectional view of a structure of a conventional heat-dissipating unit.

Next, a method for removing dust on the heat-dissipating component 37 of the heat-dissipating unit 30 built into the notebook computer 1 will be described with reference to the schematic vertical cross-sectional view of FIG. 7.

When the fan 31 is operating in order to release, from the heat-dissipating component 37, heat which is generated when heat-emitting components such as the CPU 24 operate, the first shutter means 39 for opening and closing the discharge outlet surface of the heat-dissipating component 37 is in the opened state (the first shutter means 39 in the opened state is represented by a dashed line), and the second shutter means 40 for opening and closing the opening 35 formed in the bottom surface of the fan case 32 is in the closed state (the second shutter means 40 in the closed state is represented by a solid line), as shown in FIG. 7(a).

Therefore, air (cooling air) flowing from the fan main unit 33 of the fan 31 directly passes through the heat-dissipating component 37, and is discharged outside the casing 20a through the discharge outlet 28 together with heat which is generated when the heat-emitting components such as the CPU 24 operate.

In a case where dust on the inflow surface 37b of the heat-dissipating component 37 is removed, in a state where the fan 31 is operating, the first shutter means 39 for opening and closing the discharge outlet surface of the heat-dissipating component 37 is caused to be in the closed state (the first shutter means 39 in the closed state is represented by a solid line), and the second shutter means 40 for opening and closing the opening 35 formed in the bottom surface of the fan case 32 is caused in the opened state (the second shutter means 40 in the opened state is represented by a dashed line), as shown in FIG. 7(b).

Thus, a direction in which air flows from the fan main unit 33 of the fan 31 can be changed from a direction from the fan main unit 33 toward the heat-dissipating component 37 to a direction along the inflow surface 37b of the heat-dissipating component 37 toward the opening 35. As a result, air (cooling air) supplied from the fan main unit 33 strikes against dust on the inflow surface 37b of the heat-dissipating component 37 and flows toward the opening 35. Therefore, dust on the inflow surface 37b, which is the end surface of the plurality of fins 37a of the heat-dissipating component 37 on the side thereof on which cooling air flows into the heat dissipating component 37, is removed. The dust removed from the heat-dissipating component 37 is directly discharged outside the fan case 32 through the opening 35, together with air (cooling air) flowing toward the opening 35.

An exemplary case is described in which the opening 35 is formed in the bottom surface of the fan case 32 of the fan 31 in the heat-dissipating unit 30 built into the notebook computer 1. However, the structure of the present disclosure is not limited to such a structure. The opening 35 may be formed in the top surface or the side surface of the fan case 32 between the air outlet 32b and the fan main unit 33. When, on whatever surface the opening 35 is formed, the first shutter means 39 for opening and closing the heat-dissipating component 37 on the discharge outlet side is caused to be in the closed state, and the second shutter means 40 for opening and closing the opening 35 formed in the fan case 32 is caused to be in the opened state, a direction in which air flows from the fan main unit 33 of the fan 31 can be changed from a direction from the fan main unit 33 toward the heat-dissipating component 37 to a direction toward the opening 35 along the inflow surface 37b of the heat-dissipating component 37 on the side on which cooling air flows in. Thus, air (cooling air) supplied from the fan main unit 33 strikes against dust on the inflow surface 37b of the heat-dissipating component 37 and flows toward the opening 35. Therefore, dust on the inflow surface 37b of the heat-dissipating component 37 can be removed and discharged outside the fan case 32 through the opening 35. However, in a case where the opening 35 is formed in the bottom surface of the fan case 32, the weight of the dust itself facilitates its discharge through the opening 35. For that reason the opening 35 may be formed in the bottom surface of the fan case 32.

Further, for the present embodiment, an exemplary case is described in which the notebook computer 1 in which the cover component 10 having the display device 12 disposed in the inner side surface thereof is pivotably mounted to the main unit 20 is the electronic device. However, the electronic device is not limited to the notebook computer 1 as described above. The electronic device may be various portable electronic devices such as tablet-type personal computers, mobile telephones, hand-held game devices, downsized television receivers, Blu-ray Disc™ players, and navigation systems. Further, the electronic device may be various stationary electronic devices such as desktop personal computers and liquid crystal projectors.

Further, according to the present embodiment, the CPU 24 is described as an example of a heat-emitting component which emits heat during operation. However, the heat-emitting component is not limited to the CPU 24. Various heat-emitting components, such as semiconductor chips in video boards and the like for image processing, and secondary batteries, which emit heat to be released to the exterior of the casings, are considered as the heat-emitting component.

Further, for the present embodiment, an exemplary case is described in which the heat pipe 27 is used to transfer heat from the CPU 24 to the heat-dissipating component 37. However, the heat-dissipating component 37 may be disposed in direct contact with the CPU 24, which is one of the heat-emitting components, so as to enable heat transfer.

As described above, the electronic device is structured such that, when the first shutter means for opening and closing the surface (the discharge outlet surface of the heat-dissipating component) of the heat-dissipating component on a side thereof that is reverse from the side thereof that opposes the fan is caused to be in the closed state in a state where the fan is operating, a direction in which air flows from the fan main unit of the fan can be changed from a direction from the fan main unit toward the heat-dissipating component to a direction toward the opening along the surface (the inflow surface on which cooling air flow into the heat-dissipating component) of the heat-dissipating component on the side that opposes the fan. Thus, air (cooling air) supplied from the fan main unit strikes against dust on the inflow surface of the heat-dissipating component and flows toward the opening. Therefore, dust on the inflow surface, which is the end surface of the plurality of fins of the heat-dissipating component on the side thereof on which cooling air flows into the heat dissipating component, can be removed, and discharged outside the fan case through the opening. As a result, an electronic device can be provided which has built thereinto a heat-dissipating unit that enables increase in cost and increase in the weight to be restrained, and enables dust on the heat-dissipating component to be removed with a simplified structure.

Further, the electronic device is structured such that, when dust need not be removed, the second shutter means for opening and closing the opening formed in the fan case is caused to be in the closed state, thereby increasing flow of cooling air striking against the fins.

As described above, the embodiment has been described as an exemplary technique of the present disclosure. For that purpose, the accompanying drawings and the detailed description are provided.

Therefore, components indicated in the accompanying drawings and the detailed description may include not only components which need to be provided in order to solve the problems, but also components which need to be illustrated for describing the implementation but may not be provided for solving the problems. Therefore, the components which may not be provided should not be instantly construed as being indispensable even if the components which may not be provided are indicated in the accompanying drawings and the detailed description.

Further, the embodiment described above is intended to illustrate the technique of the present disclosure. Various modifications, replacements, additions, and deletions may be devised within the scope of claims or within the equivalent scope.

What is claimed is:

1. An electronic device comprising:
   a casing interiorly accommodating electronic components including a heat-emitting component that emits heat during operation, the casing having an exteriorly opening discharge outlet;
   a heat-dissipating unit including:
      a heat-dissipating component having a plurality of fins to which heat is transferred from the heat-emitting component, and
      a fan made up of a fan main unit and a fan case housing the fan main unit, the fan case having an air outlet disposed in close contact with an opposing side of the heat-dissipating component, and an opening formed in the fan case in a location between the air outlet and the main unit, the fan for flowing air through the heat-dissipating component; and
   a first shutter provided on a side of the heat-dissipating component that is reverse from the opposing side of the heat dissipating component, and facing the discharge outlet in the casing that opposes the fan,
   wherein when the heat-dissipating unit is in a first mode of operation, the first shutter configured for allowing airflow through the heat-dissipating component and the discharge outlet, whereby heat transferred from the heat-emitting component to the heat-dissipating component is heat-exchanged with the air flowing from the fan, the heated airflow being released outside the casing through the discharge outlet, and
   wherein when the heat-dissipating unit is in a second mode of operation, the first shutter configured for shutting off the airflow through the heat-dissipating component and the discharge outlet, whereby the air from the fan main unit flows along the opposing side of the heat-dissipating component and passes through the opening formed in the fan case.

2. The electronic device according to claim 1, further comprising a second shutter disposed over the opening in the fan case, the second shutter configured for opening and closing the opening.

3. The electronic device according to claim 1, wherein the opening in the fan case is formed in a bottom surface thereof.

* * * * *